E. W. HEWITT AND GEORGE GORHAM, OF PECATONICA, ILLINOIS.

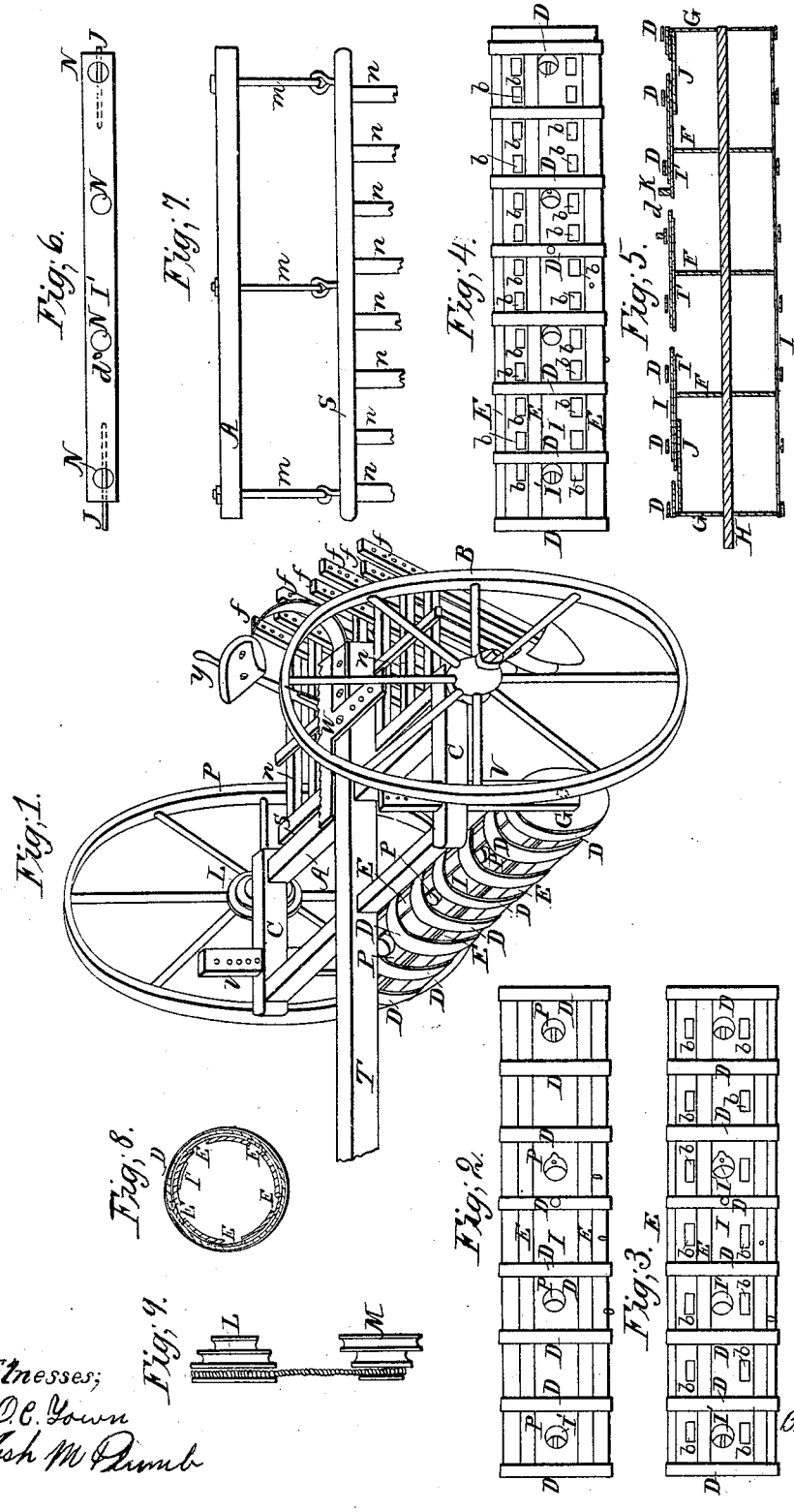

Letters Patent No. 88,787, dated April 13, 1869.

IMPROVEMENT IN SEEDER AND CULTIVATOR.

The Schedule referred to in these Letters Patent and making part of the same.

*To all whom it may concern:*

Be it known that we, E. W. HEWITT and GEORGE GORHAM, of Pecatonica, in the county of Winnebago, and State of Illinois, have invented an Improved Seeder and Cultivator; and we do hereby declare that the following is a full, clear, and exact description thereof, which will enable others skilled in the art to make and use the same, reference being had to the accompanying drawings, and letters marked thereon, making a part of this description, in which—

Figure 1 is a perspective representation of our improved seeder and cultivator.

Figure 2, an elevation of the seeder removed from the frame, and arranged to receive seed-grain.

Figure 3, an elevation of the same, arranged to sow grain in drills.

Figure 4, an elevation of the same, arranged to sow grain broadcast.

Figure 5, a longitudinal section, taken on the line x x, fig. 8.

Figure 6, an elevation of the slide for closing the seeder, removed.

Figure 7 represents the manner in which the cultivator is attached to the axle-tree.

Figure 8, a transverse section of the seeder, taken on the line z z, fig. 2.

Figure 9, a view of the gearing which drives the seeder.

The nature of the present invention consists—

First, in the novel construction of a seed-cylinder, which is so arranged, by means of slots, or perforations, and an outer case, consisting of bands and strips, that the latter may be set to close a portion of the perforations when grain is to be sown in drills, and uncover the perforations when grain is to be sown broadcast; and, in combination with the foregoing, a peculiarly-arranged slide, by means of which access is had to the inside of the cylinder.

Second, in the novel arrangement of the cultivating-attachment at the rear of the axle.

A is the axle-tree;
B, the wheels;
C, the frame; and
T, the tongue of an ordinary sulky-seeder and cultivator, which are common devices, and they therefore need no particular description.

V represents standards, which are put through mortises in the frame C, and so arranged to be raised and lowered by means of pins put through holes in their upper ends, that a cylindrical seeder, G, may occupy any suitable position above the ground.

This seeder is constructed with a cylinder, I, ends G, and partitions F, the latter being used to keep grain in all parts of the cylinder, as nearly alike as possible. It also has a series of holes, or perforations, *b b*, &c., made through it, of suitable size for seed to pass out, and holes, P, for the convenience of putting in grain.

A slide, I', fig. 6, has holes, N, made through it, corresponding to the holes P, fig. 2, in the cylinder I, and it is arranged to slide back and forth longitudinally, on supports J, rigidly fastened to the ends G, and in recesses made in the edges of the partitions F, a pin, *d*, fig. 6, projecting through one of the holes P, being used to move the slide.

An outer case, consisting of a series of strips, or staves, E, corresponding in number to the number of rows of holes in the cylinder I, is held by a series of bands, D, and operated as follows:

At fig. 1 the cylinder is closed, as when carrying grain to or from a field.

To put in grain, the slide I' is to be drawn out, as at fig. 2.

To set the case to sow grain in drills, so turn the case on cylinder I as to bring the strips E between the rows of holes *b*, as shown at fig. 3.

To sow broadcast, so move the strips E longitudinally with the cylinder, as to uncover all of the holes *b*, as shown at fig. 4.

The seeder is rotated by means of a pulley, L, figs. 1 and 9, fixed to the hub of one of the wheels B, in the ordinary manner, and a pulley, M, attached to the end of the cylinder-shaft H, fig. 5.

A frame, S, figs. 1 and 7, is jointed to the axle A, by means of rods *m*, and supports beams *n*, to which shovel-standards *f* are bolted fast in the usual manner, said frame being raised and lowered by means of a lever, Y, and a ratchet-plate, W.

Having thus described our invention,

What we claim, and desire to secure by Letters Patent of the United States, is—

1. A seeder, G, composed of a cylinder, I, outer case D E, slide I', arranged to operate as and for the purpose set forth.

2. The combination of the seeder with the standards V and frame C, as described.

3. The combination of the seeder with standards V, frames C and S, beams *n*, rods *m*, and shovel-standards *f*, as and for the purpose set forth.

E. W. HEWITT.
GEO. GORHAM.

Witnesses:
O. C. TOWN,
JOS. M. PLUMB.